UNITED STATES PATENT OFFICE.

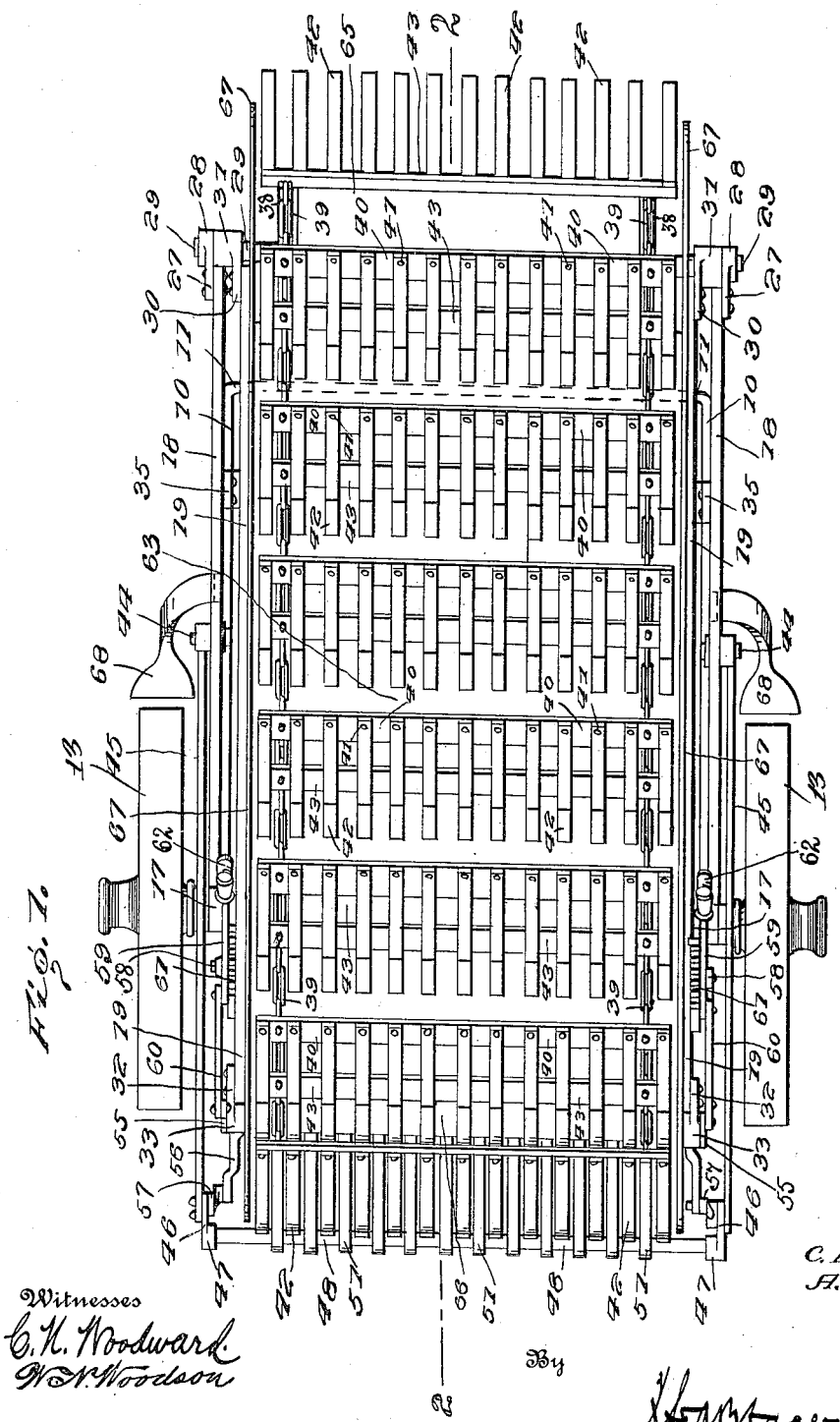

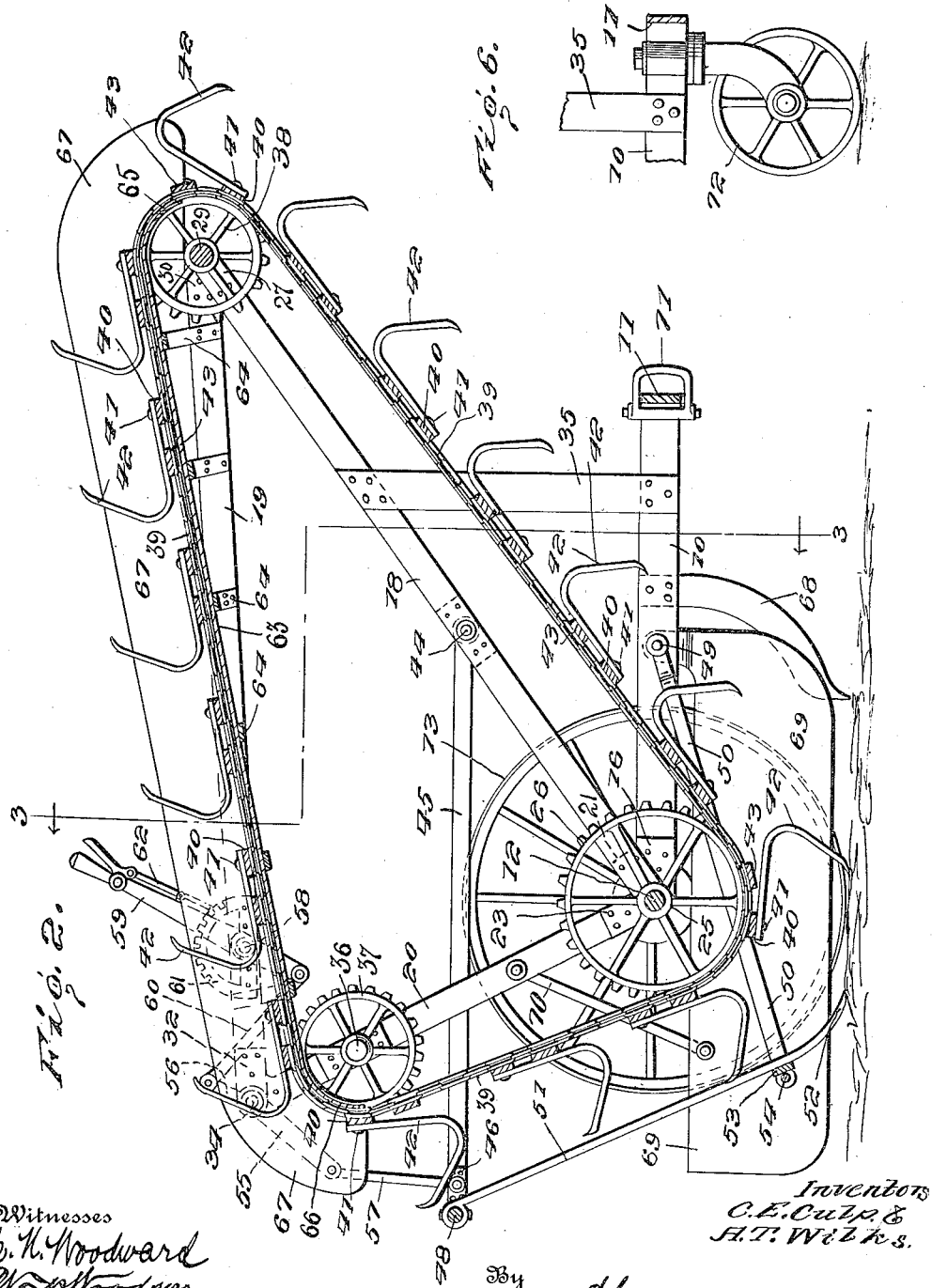

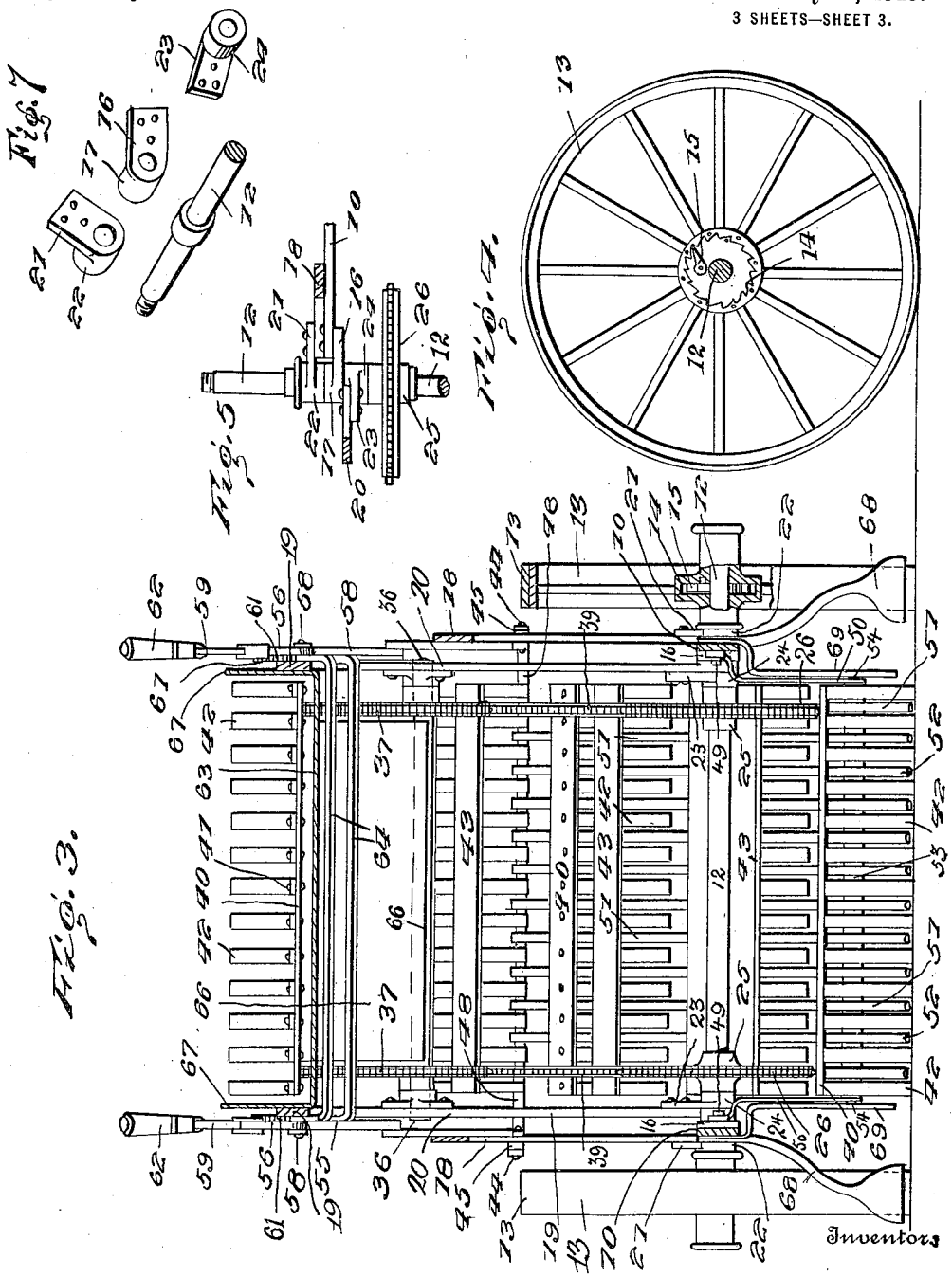

CLIFFORD E. CULP AND ALLEN T. WILKS, OF STELLA, MISSOURI.

STONE RAKER AND LOADER.

1,139,168.   Specification of Letters Patent.   Patented May 11, 1915.

Application filed June 27, 1914. Serial No. 847,672.

*To all whom it may concern:*

Be it known that we, CLIFFORD E. CULP and ALLEN T. WILKS, citizens of the United States, residing at Stella, in the county of Newton and State of Missouri, have invented certain new and useful Improvements in Stone Rakers and Loaders, of which the following is a specification.

This invention relates to improvements in devices for gathering and loading loose stones from fields, roadways, and the like, and has for one of its objects to improve the construction and increase the efficiency and utility of devices of this character.

Another object of the invention is to provide a device of this character which is adapted to be attached to the rear of a wagon in position to deposit the stones gathered by the machine in the wagon as the latter together with the machine is drawn over the ground.

Another object of the invention is to provide a device of this character combining a raking device and an elevator, with the raking device adjustable to respond to the condition of the ground over which the machine is operated, and which may be elevated out of the way when not in use, or when the machine is being transported from place to place.

With these and other objects in view the invention consists in certain novel features of construction as hereinafter shown and described and then specifically pointed out in the claims; and in the drawings illustrative of the preferred embodiment of the invention—

Figure 1 is a plan view of the improved device. Fig. 2 is a longitudinal sectional elevation on the line 2—2 of Fig. 1. Fig. 3 is a transverse section on the line 3—3 of Fig. 2. Fig. 4 is a view of one of the drive wheels, illustrating the arrangement of one of the backing ratchets. Fig. 5 is a detail view illustrating the arrangement of the couplings between the frame members and the main axle. Fig. 6 is a detail of one of the caster wheels. Fig. 7 represents a portion of the main axle and the coupling brackets whereby the frame members are supported from the main axle.

Corresponding and like parts are referred to in the following description and indicated in all the views of the drawings by the same reference characters.

The improved device comprises in general a supporting frame mounted upon carrier wheels which are likewise the traction wheels whereby motion is imparted to the elevating mechanism, a forwardly and upwardly inclined frame which carries the elevating mechanism, and a raking device mounted to swing upon the main frame and coacting with the elevator mechanism, and guide devices to hold the stones in position relative to the raking device until the elevating mechanism reaches them.

The main supporting frame is preferably constructed from a single piece oblong in outline and with spaced sides 10 and a transverse forward end portion 11. An axle 12 is mounted for rotation relative to the frame side members 10 and other portions of the frame near their rear ends and adapted to receive the combined traction and carrier wheels 13. A backing ratchet indicated conventionally at 14, is formed in the hub of each wheel and each wheel is provided with a pawl 15 to engage respectively with the ratchets, the pawls and ratchets being so arranged that when the machine is moving forwardly the wheels will be rotated with the axles, but when the machine is moving rearwardly, the traction wheels will turn without rotating the axle and its attachments. Connected to the rear terminals of the side members 10 of the main frame are supporting plates 16 each having a hub 17 engaging around the axle. The frame for supporting the elevator belt is constructed of lower members 18, upper members 19 and rear members 20 and arranged in triangular form with the lower members 18 each disposed at a forward and upward incline as represented in Fig. 2. At the rear ends the frame members 18 are connected to supporting plates 21 having hubs 22 engaging around the axle, while the frame members 20 are connected to similar supporting plates 23 having hubs 24 which engage around the axle.

Mounted by their hubs 25 upon the axle 12 are chain-wheels 26, the chain-wheels of the hubs being fixed to the axle and rotating therewith, while the hubs 17—22 and 24 of the supporting plates 16—21 and 23 engage end to end and are held from movement endwise upon the axle, while the latter is free to rotate within the hubs 17—22 and 24. At its forward upper end each of the frame members 18 is connected to a supporting plate 27 having a hub 28 engaging around a counter shaft 29 which extends from side to side of the machine. At its forward end each of the frame members 19 is connected to a supporting plate 30 having a hub 31 engaging around the shaft 29, the hubs 28—31 engaging end to end upon the shaft which rotates therein. At their meeting points the frame members 19—20 are connected to a supporting plate 32 having a hub 33 in each of which a stub shaft 34 is mounted to oscillate. The frame members 10 and 18 are connected by vertical brace members 35. By this arrangement the frame members 10—18—19—20 are firmly coupled and united and form the side frames of the machine.

Connected to the frame members 20 is a shaft 36 carrying chain-wheels 37, while the shaft 29 carries similar chain wheels 38, the three chain wheels 26, 37 and 38 at each side of the machine being in vertical alinement and adapted to support endless chains represented conventionally at 39. By arranging the frame members 18 in the forwardly and upwardly inclined position from the main axles 12, the lower side of the chain when running moves at a downward and rearward incline, while the upper portion of the chain moves in an upwardly and forwardly inclined position as represented in Fig. 2.

Connected across the chains 39 at suitable intervals are bars 40, the bars being spaced apart at uniform distances, generally about 18 inches, but these distances may be varied, if preferred. Riveted or otherwise connected to each of the bars 40 at 41 are a plurality of teeth or fingers 42, each of the teeth being directed for a distance in parallel relation to the chains and thence curved outwardly with the terminals curved slightly toward the bar 40, as shown. Each set of the fingers thus forms a basket-like structure which operates to gather the stones and elevate the same as the machine is moved forwardly and the chains rotated around the chain-wheels. Attached across the chains 39 and spaced from each of the bars 40 is another bar 43. Pivoted at 44 to each of the frame members 18 is a bar 45, each bar being connected at its rear end to a supporting plate 46 having a hub 47 in which a transverse raker head member 48 is supported.

Pivoted at 49 to each of the frame members 10 is a radius bar 50. Connected to the head member 48 are a plurality of raking teeth 51, preferably corresponding in number to the gathering fingers 42 as illustrated in Figs. 1 and 3, each raking tooth being curved forwardly at its lower end as represented at 52. Connected across the rear of the raking teeth 51 is a supporting bar 53, and the radius bars 50 are connected to the bar 53 at its ends as represented at 54. The members 45—50 are so arranged that they support the raking teeth normally in a forwardly and downwardly inclined position substantially parallel to the rear frame member 20, so that the gathering fingers 42 travel in close proximity to the raking teeth while passing the same as represented in Fig. 2. By this arrangement the gathering fingers and the raking teeth coöperate to elevate whatever material or object the fingers may gather in the course of their operation as hereafter more fully explained.

Extending from each of the stub shafts 34 is a relatively long arm 55 and a relatively short arm 56. The longer arms 55 are connected to the raking device, preferably to the supporting plates 46, by rods 57. Pivoted at 58 to each of the frame members 19 is an operating lever 59, the lower end of the levers being connected respectively to the shorter arm 56 by connecting rods 60. Each lever arm operates over a toothed segment 61 and is provided with a pawl device 62 to engage the teeth of the segment and thus hold the lever at any adjusted point. By this simple arrangement, it will be obvious, that when the levers 59 are moved to their rearward position the stub shafts 34 will be oscillated and the raking device elevated by the coaction of the arms 55 and connecting rods 57, and by employing the toothed segment 61 the raking teeth may be adjusted to any desired point relative to the ground.

Extending beneath the upper portion of the carrier chains is a guard plate 63 preferably of plate metal of sufficient strength to withstand the strains to which it is subjected and supported at suitable intervals by transverse members 64 riveted or otherwise secured to the plate members 19. At its forward end the supporting member 63 is curved as shown at 65 to correspond to the curvature of the chains as they pass around the wheels 38, and likewise curved at its rear end as represented at 66 to correspond to the curvature of the chain as it passes around the wheels 37. The supporting member 63 is continued upwardly at its side edges in the form of side guards 67 to confine the material being conveyed and prevent it from falling out laterally.

Attached to the frame members 10 are guard devices 68 which operate in advance of the wheels 13 to remove obstructions in the path of the wheels, as the machine is moved forwardly.

Located below the line of the frame members 10 and relatively close to the terminals of the bars 40 are guard members 69 preferably of plate metal and connected at their forward ends to the members 10, for instance by the same pivots 49 by which the radius bars 50 are secured, and supported from the frame members at their rear ends by rods 70.

It will be noted that the transverse portion 11 of the main frame is located considerably to the rear of the forward upper portion of the conveyer belts, and that the member 11 of the frame is provided with a clevis 71. By this means the improved device is adapted to be coupled to the rear end of a wagon with the forward or discharge end of the conveyer mechanism in position to discharge its load into the wagon as the wagon together with the machine is drawn over the ground. This will be the preferable manner of using the device, but if preferred caster wheels 72 may be employed beneath the frame members 10 near the transverse member 11, as illustrated in Fig. 6, in addition to the clevis device 71.

With a machine thus constructed, it will be obvious, that as the framework carrying the gathering and elevating mechanism is moved forwardly the endless chains will be actuated and cause the gathering fingers to travel in close proximity to the ground and gather stones or other matter and elevate them and discharge them at the upper forward end, the loose material being supported by the plate 63 and prevented thereby from falling through between the bars.

Having thus described the invention, what is claimed as new is:

1. In an apparatus of the class described, a supporting frame, an endless flexible member carried by said frame and having gathering teeth, a raking device associated with said gathering teeth, upper radius members pivoted respectively to said frame and to said raking device at its upper part, lower radius members pivoted respectively to said frame and to said raking device near its lower part, and means for vertically adjusting said raking device to cause it to swing with said radius members.

2. In an apparatus of the class described, a supporting frame, a flexible traveling belt carried by said frame and including a plurality of gathering teeth, a raking device, upper radius members pivoted respectively to said frame and said raking device at its upper part, lower radius members pivoted respectively to said frame and to said raking device near its lower part, and means for vertically adjusting said raking device to cause it to swing with said radius members.

3. In an apparatus of the class described, a supporting frame, an elevating device supported upon said frame and including gathering fingers and arranged for downward and rearward and thence upward movement, upper radius members swinging from said frame, a head member connected to said upper radius members and having raker teeth, lower radius members swinging from said supporting frame and connected to said raker teeth, and means for vertically adjusting said radius bars and the raker device carried thereby.

4. In an apparatus of the class described, a supporting frame, a flexible member connected to said frame and including gathering teeth and arranged to move downwardly and rearwardly thence upwardly and rearwardly and thence forwardly, a raking device coacting with the upwardly and rearwardly moving portion of the flexible member, upper radius members pivoted respectively to said frame and to said raking device at its upper part, lower radius members pivoted respectively to said frame and said raking device near its lower part, and means for vertically adjusting said raking device to cause it to swing with said radius members.

In testimony whereof we affix our signatures in presence of two witnesses.

CLIFFORD E. CULP. [L. S.]
ALLEN T. WILKS. [L. S.]

Witnesses:
J. F. MANESS,
E. C. LINK.

Copies of this patent may be obtained for five cents each, by addressing the "Commissioner of Patents, Washington, D. C."